United States Patent
Ruan (10) Patent No.: US 7,413,170 B2
(45) Date of Patent: Aug. 19, 2008

(54) SPLIT WINCH BAND SHAFT FAST ROTATING DEVICE

(75) Inventor: Boqin Ruan, Zhugang Town (CN)

(73) Assignee: Zhejiang Topsun Logistic Control Co., Ltd., Zhejiang Province (CN)

(*) Notice: Subject to any disclaimer, the term of this patent is extended or adjusted under 35 U.S.C. 154(b) by 344 days.

(21) Appl. No.: 11/300,490

(22) Filed: Dec. 15, 2005

(65) Prior Publication Data

US 2007/0114504 A1 May 24, 2007

(30) Foreign Application Priority Data

Oct. 24, 2005 (CN) .................. 2005 1 0061237

(51) Int. Cl.
*B66F 3/00* (2006.01)
(52) U.S. Cl. .............. 254/244; 254/223; 24/69 CT
(58) Field of Classification Search .............. 254/223, 254/243, 244; 24/68 CD, 69 CT; D34/33
See application file for complete search history.

(56) References Cited

U.S. PATENT DOCUMENTS

| | | | | |
|---|---|---|---|---|
| 5,494,387 A * | 2/1996 | Ruegg | ............... | 410/103 |
| 5,842,659 A * | 12/1998 | Ligon et al. | ............... | 242/394.1 |
| 6,481,692 B1 * | 11/2002 | King | ............... | 254/219 |
| 6,729,604 B1 * | 5/2004 | Claycomb | ............... | 254/217 |
| 6,824,121 B2 * | 11/2004 | Boice | ............... | 254/223 |
| 7,069,623 B2 * | 7/2006 | Lu | ............... | 24/68 CD |
| 7,108,246 B2 * | 9/2006 | Fortin | ............... | 254/222 |
| 7,278,808 B1 * | 10/2007 | Sisk et al. | ............... | 410/156 |
| 2002/0195594 A1 * | 12/2002 | Cauchon | ............... | 254/243 |

FOREIGN PATENT DOCUMENTS

| | | |
|---|---|---|
| CN | 1586950 Y | 3/2005 |
| CN | 2717753 Y | 8/2005 |

* cited by examiner

*Primary Examiner*—Emmanuel M Marcelo
(74) *Attorney, Agent, or Firm*—Cheng Law Group PLLC (57) ABSTRACT

A split winch band shaft fast rotating device is provided herein. The device is disposed at the band shaft extension end at one side of the winch mount, and includes a band shaft joint and a rotator. At least one crowbar hole is set on the rotator. The rotator is coupled to one side of the band shaft joint with a unidirectional linkage mechanism set at the contact surface thereof. The band shaft extension end has at least one pin hole. The band shaft joint could be inserted into or covered on the band shaft extension end with a detachable connection mechanism arranged therebetween which could make the joint fixedly connected to the extension end by inserting one or more axle pins into the pin holes. The split winch band shaft fast rotating device is low in cost, convenient in maintenance, flexible in operation, and could improve the bundling speed of the winch.

19 Claims, 11 Drawing Sheets

SPLIT WINCH BAND SHAFT FAST ROTATING DEVICE

BACKGROUND OF THE INVENTION

1. Field of Invention

The present invention relates to mechanical field, and more particularly to a bundling tool for automobiles.

2. Related Art

Goods usually need to be bundled during transportation, in order to prevent from being dropped off when the automobile runs and colliding with each other with the result of loss or damage. Though it is a usual way to bundle goods directly with ropes, it takes time and labor, and is difficult to bundle goods tightly, thereby inducing safety problems.

The winch is popular with drivers as an advanced bundling tool, as it is convenient and safe to bundle goods with the winch. Currently, the winch widely used is provided with a mount and a band shaft, wherein the band shaft is installed at the mount and can rotate. The bundling bands of the bundler wrap around the band shaft. In this way, the bundling bands are tightened by rotating the band shaft, so that the goods can be bundled tightly. The method currently used for tightening the bundling bands by rotating the band shaft is to insert a crowbar into a crowbar hole at one end of the band shaft, turn the crowbar, and make the band shaft rotate. As the winch is fixed to the automobile body, it is limited in position. Therefore, after the crowbar is turned to make the band shaft rotate some angle in operation, the crowbar must be pulled out and inserted into another crowbar hole, thereby continuing to make the band shaft rotate. It is apparent that said operation takes time and labor, and it tends to damage the fingers and other parts of the operator by pulling the crowbar out and inserting it again on and on.

To overcome the above-mentioned problems, a winch band shaft fast rotating device which includes a fixed seat and a rotor is provided herein, wherein, the fixed seat is fixedly connected to a band shaft, the rotor is coupled to one side of the fixed seat with a unidirectional linkage mechanism set at the contact surface thereof, and at least one crowbar hole is provided on the rotor. With such a rotating device, the crowbar doesn't need to be pulled out during operation due to the unidirectional linkage mechanism, which makes the operation safe and labor saving and will not cause damages to the products or human body. However, said band shaft fast rotating device is integrated with the winch, so that there is such a rotating device set at each one of the band shaft extension ends. Therefore, it is more difficult to manufacture the winch and the manufacturing processes are increased, with the result of the increased manufacturing cost of each winch. Furthermore, once the rotating device fails beyond repair, the whole winch must be replaced, which increases the use cost while decreases the operational flexibility.

SUMMARY OF THE INVENTION

An object of the present invention is to provide a split band shaft fast rotating device used with a winch, which can be mounted and removed at any moment, so that the use cost is decreased while the operational flexibility is increased. In this way, the above-mentioned problems associated with the prior art can be addressed, in which the band shaft rotating device is integrated with the winch, with the result of increased manufacturing difficulty and manufacturing processes as well as high cost.

Another object of the present invention is to provide a split winch band shaft fast rotating device which facilitates ordinary maintenance. Once the rotating device is damaged beyond repair, it can directly be replaced, in order to make the winch keep on working. In this way, the technical problems associated with the prior art can be addressed, in which it is hard to maintain and once damaged, the whole winch will be out of use, with the result of high cost.

Yet another object of the present invention is to provide a split winch band shaft fast rotating device which makes the winch band shaft rotate fast. Wherein, the crowbar doesn't need to be pulled out during operation so as to make the operation convenient, labor saving, safe and reliable and increase the bundling speed of the winch. In this way, the technical problems associated with the prior art can be addressed, in which the operational process is complicated and inefficient, and takes time and labor, furthermore, the crowbar needs to be pulled out and inserted on and on during use.

In order to achieve the foregoing objects, the present invention provides a split band shaft fast rotating device disposed at the band shaft extension end at one side of the winch mount which includes a band shaft joint and a rotator, wherein at least one crowbar hole is provided on the rotator, the rotator is coupled to one side of the band shaft joint with a unidirectional linkage mechanism set at the contact surface thereof, characterized in that, the band shaft extension end has at least one pin hole, the band shaft joint may be inserted into or covered on the extension end, and a detachable connection mechanism is provided between the band shaft joint and the band shaft extension end for making the joint fixedly connected to the extension end by inserting one or more axle pins into the pin holes.

When in use, the winch mount is fixed on the automobile, with the device of the invention mounted at the band shaft extension end at one side of the winch mount and connected to the extension end. In operation, the crowbar is inserted into the crowbar hole and turned to and fro. The winch band shaft could rotate in one way by using the unidirectional linkage mechanism, so as to tighten the bundling bands wrapped around the band shaft.

According to the invention, the device provided herein forms a detachable split structure with the winch by one or more axle pins. The device can be mounted to the winch as required. In this case, not only the manufacturing cost is efficiently reduced, but also the defects associated with the prior art are overcome.

In the split winch band shaft fast rotating device of the invention, said connection mechanism is a post disposed at one end of the band shaft joint which could be inserted into the extension end, and one and more axle pins pass through the corresponding pin holes on the extension end and are fixedly connected to the post. The band shaft extension end can be fixedly connected to the joint through said structure, in which the connection mechanism of the band shaft fast rotating device is inserted into the extension end.

There are various ways to match the axle pin(s) with the post herein. For purposes of safety and reliability, in the split winch band shaft fast rotating device of the invention, there are several pin holes described above, each of which has an axle pin passed through. The axle pins are threadedly connected to the post.

In the split winch band shaft fast rotating device of the invention, said connection mechanism is a cavity at one end of the band shaft joint which can receive the band shaft extension end. One or more pin holes are provided on the side wall of the cavity. An axle pin passes through the pin holes on the band shaft extension end and the pin holes on the side wall of the cavity. The extension end can be fixedly connected to the joint through said connection mechanism. In this case, the connection mechanism of the band shaft fast rotating device receives the extension end.

In order to further improve the connecting strength between the band shaft extension end and the joint, in the split winch band shaft fast rotating device of the invention, a through hole is set on said axle pin with a driven pin passing through the hole, both ends of the driven pin are inserted in the pin holes on the band shaft extension end and the pin holes on the band shaft joint. In general, the driven pin is arranged perpendicular to the axle pin, so as to form a cross structure together. However, the driven pin could be parallel with the axle pin instead, and more than one driven pin and axle pin may be used.

In the split winch band shaft fast rotating device of the invention, a protruded riveting block is disposed at one end of the band shaft joint with a stopper riveted thereto. The rotator is blocked by the outer edges of the stopper after it is covered on the band shaft joint. This is a way of connecting the band shaft joint with the rotator.

Another way is also available, i.e., in the split winch band shaft fast rotating device of the invention, a connecting screw is disposed between the band shaft joint and the rotator. The rotator is blocked by the top outer edges of the connecting screw after it is covered on the band shaft joint.

In the split winch band shaft fast rotating device of the invention, said unidirectional linkage mechanism includes several spring holes arranged on the rotator at the contact surface of the rotator and the band shaft, each of which has a spring and a plunger mounted from inside to outside, the plunger is pressed against one side of the band shaft joint under the action of the spring. One side of the band shaft joint is provide with a corresponding number of chutes which are located corresponding to the spring holes. One side of the chute is a bevel face that inclines along the rotating direction of the rotator and extends to the side surface of the joint, while another side is an upright face perpendicular to the side surface of the joint.

During the period of using the device of the present invention, when the rotator is rotated along the direction in which the bevel face of the chute inclines, the plunger protruded out of the spring hole by the spring moves upwards along the bevel face of the chute, so that the plunger is contracted into the spring hole until it is pressed against one side surface of the fixed seat. Then, the plunger will get into next chute to repeat said process. It is apparent that, when the rotator is rotated along this direction, the band shaft joint is stationary. In other words, the rotator can't drive the band shaft to rotate.

On the other hand, if the rotator is rotated along the opposite direction, the plunger will be blocked by the upright face of the chute after it gets into the chute, so that it can't slide through the chute. In this way, the rotator is linked with the band shaft joint. Under the turning moment of the rotator, the band shaft joint will rotate together finally to drive the band shaft to rotate.

In the split winch band shaft fast rotating device of the invention, the chutes are uniformly distributed on one side of the band shaft joint, and the spring holes are uniformly distributed on the rotator.

In the split winch band shaft fast rotating device of the invention, two crowbar holes for receiving the crowbar are arranged oppositely on said rotator.

When the rotating device of the present invention is used in the winch, the rotating direction of the rotator should be corresponding to the reeling direction of the winch band shaft as the rotator is linked with the band shaft joint. The crowbar is inserted into the crowbar holes of the rotator and turned to and fro during use. Since the band shaft joint could only rotate in one way, the band shaft could be driven to tighten the bundling bands. Said rotating device could be detached from the winch after use, it could also be used with other winches. In other words, several winches could share only one rotating device.

The split winch band shaft fast rotating device of the invention has the following advantages over the prior art.

(i) A split structure is used to effectively simplify the structure of the winch, thereby reducing the manufacturing cost. In this way, several winches could share only one rotating device to tighten the bundling bands.

(ii) It facilitates daily maintenance. Once the rotating device is damaged beyond repair, it can directly be replaced while the winch still can be used, thereby improving the level of resources utilization.

(iii) It can be mounted and removed at any moment, so that it is flexible and easy to operate.

(iv) The crowbar doesn't need to be pulled out during operation, so that the bundling speed of the winch is enhanced and the operation is more reliable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

With reference to FIGS. 1-4, the split winch band shaft fast rotating device of the present invention is disposed at the band shaft extension end 5a at one side of the winch mount 1. The device includes a band shaft joint 2 and a rotator 3 with two crowbar holes 4 for receiving a crowbar oppositely arranged thereon. A unidirectional ratchet wheel 23 fixedly connected to the band shaft 5 is set at the other side of the winch mount 1. One end of the band shaft 5 extends out of one side of the winch 1 through the band shaft holes 1a of the winch mount 1. The ratchet wheel 23 is fixedly connected to this extension end. A ratchet 24 is set at one side of the unidirectional ratchet wheel 23 for seizing the ratchet wheel as shown in FIG. 5, so that the band shaft 5 could only rotate in one way during winding. In this embodiment, the ratchet axle 22 is fixedly connected to one side of the winch mount 1 and the ratchet 24 is sticked to the ratchet axle 22, so that the ratchet 24 will not detach from the ratchet axle 22 during rotation.

Figure 1:
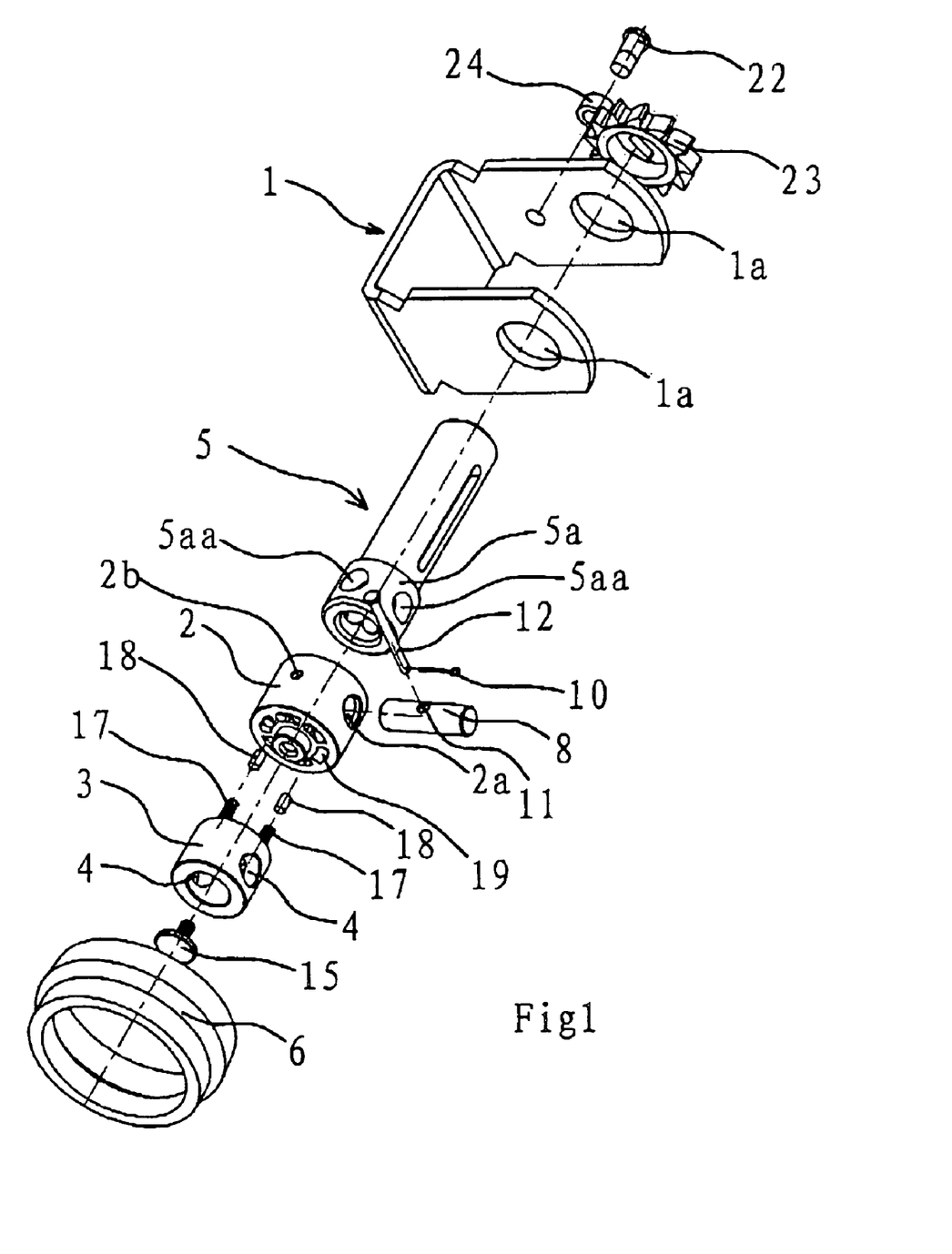
FIG. 1 is a three-dimensional exploded schematic view of a split winch band shaft fast rotating device according to the present invention.
Figure 2:
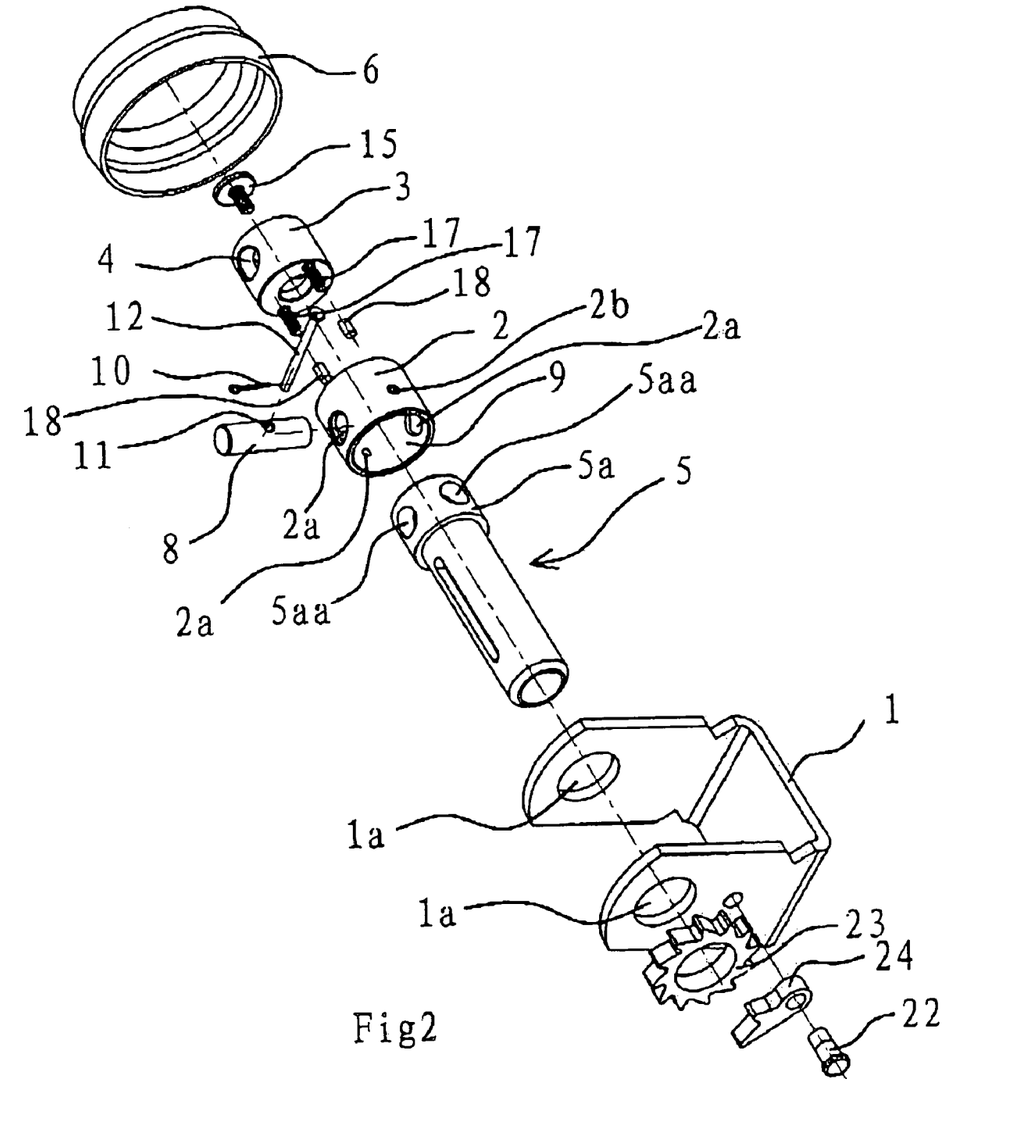
FIG. 2 is a three-dimensional exploded schematic view of the split winch band shaft fast rotating device according to the present invention taken from another viewing angle.
Figure 3:
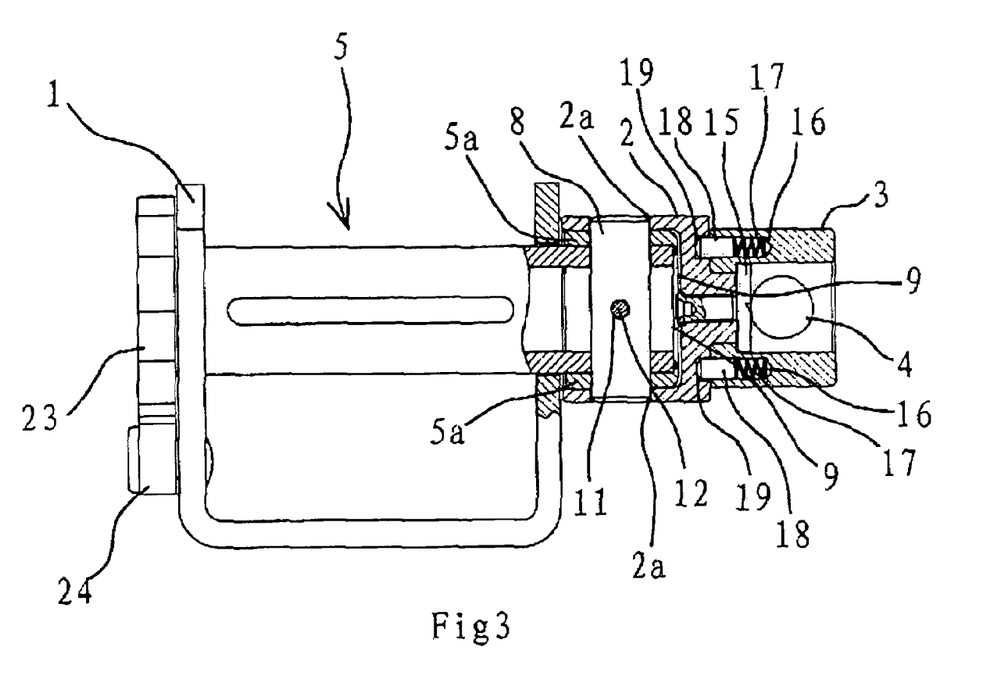
FIG. 3 is a structural schematic view of the split winch band shaft fast rotating device according to the present invention in operation.

The other end of the band shaft 5, i.e., band shaft extension end 5a, also extends out of the winch mount 1 at the other side as shown in FIGS. 1-3. In this embodiment, there are four uniformly distributed pin holes 5aa set on the side of the band shaft extension end 5a.

As shown in FIGS. 1 and 2, the fast rotating device of the present invention is disposed at said band shaft extension end 5a. The device includes a band shaft joint 2 and a rotator 3. Wherein, the rotator 3 is coupled to one side of the joint 2, with a unidirectional linkage mechanism set at the contact surface thereof.

Figure 6:
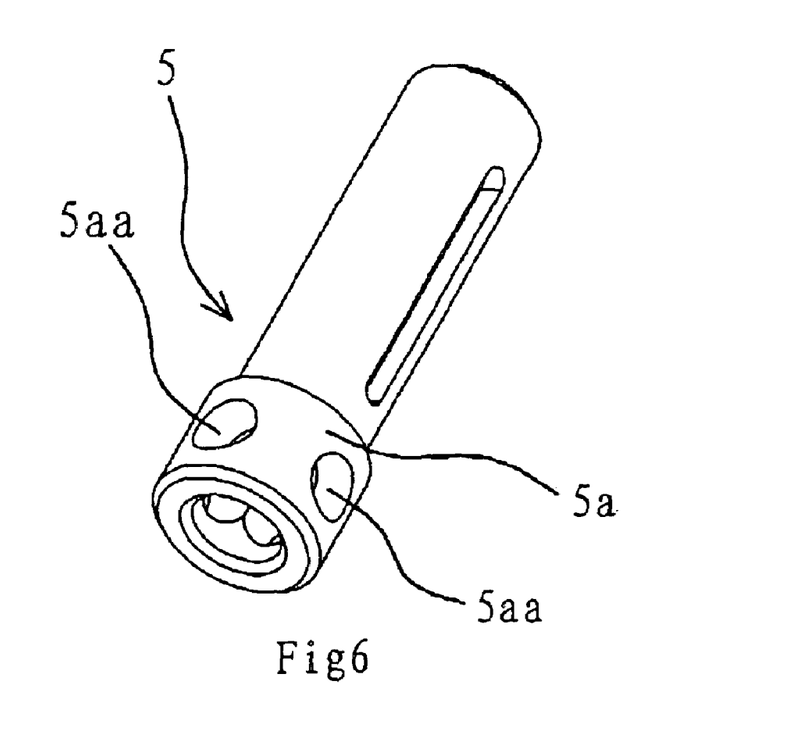
FIG. 6 is a three-dimensional schematic view of the band shaft of the split winch band shaft fast rotating device according to the present invention.
Figure 7:
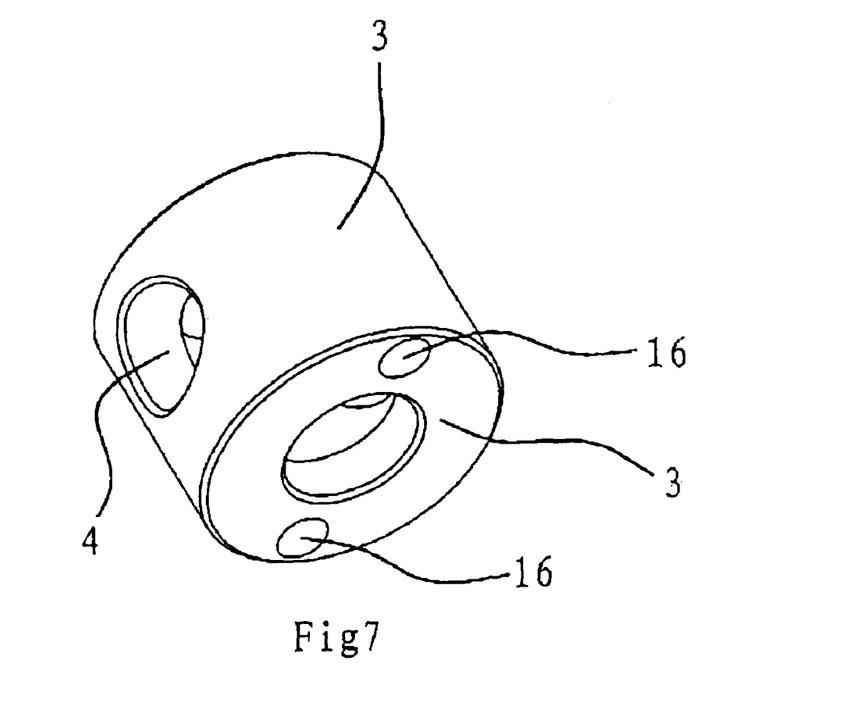
FIG. 7 is a three-dimensional schematic view of the rotator of the split winch band shaft fast rotating device according to the present invention.
Figure 8:
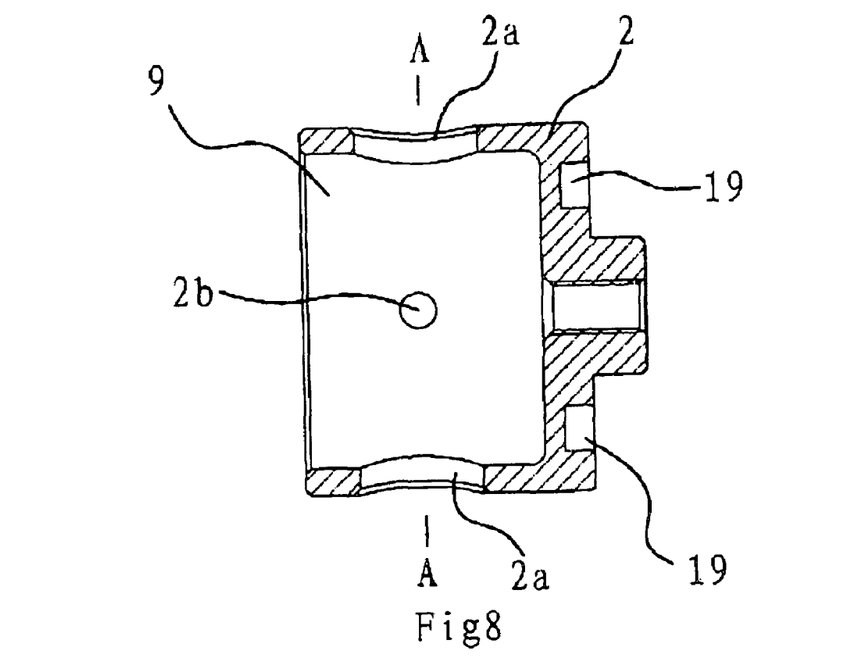
FIG. 8 is a sectional view of the band shaft joint of the split winch band shaft fast rotating device according to the present invention.
Figure 9:
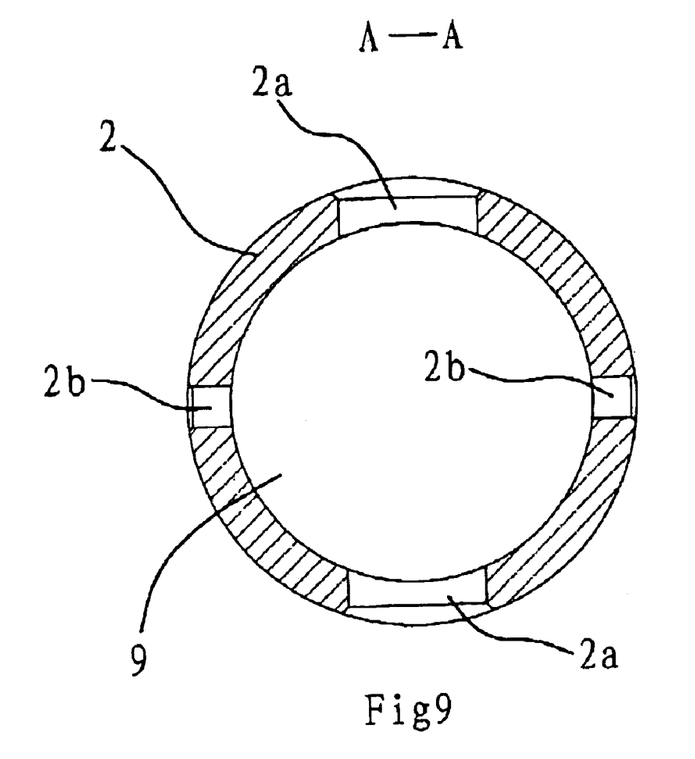
FIG. 9 is a sectional view taken along A-A in FIG. 8.
Figure 10:
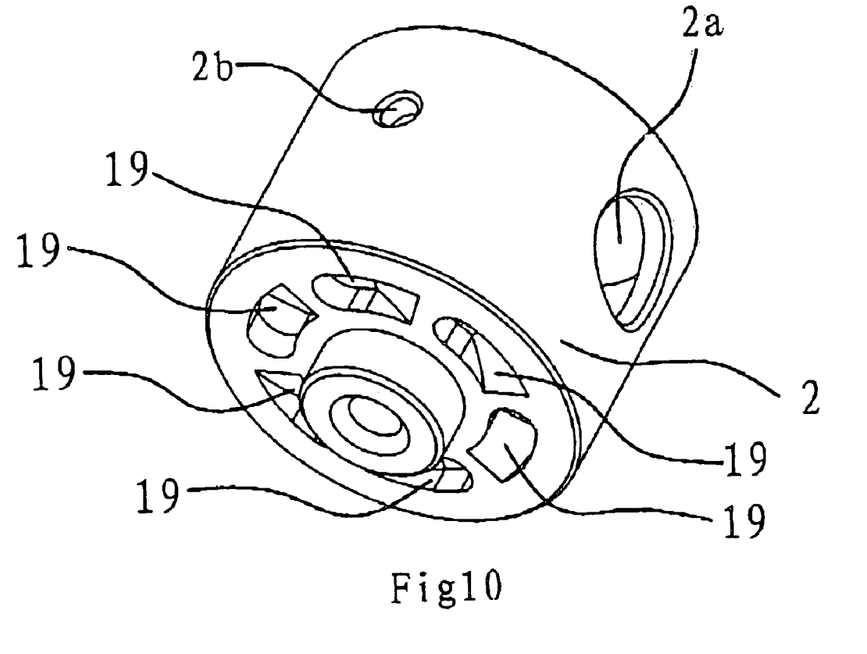
FIG. 10 is a three-dimensional schematic view of the band shaft joint of the split winch band shaft fast rotating device according to the present invention.

Two pin holes 2a are oppositely arranged on the side of the band shaft joint 2 as shown in FIGS. 6 and 7. A detachable connection mechanism is provided between the band shaft joint 2 and the band shaft extension end 5a. In this embodiment, said connection mechanism is a cavity at one end of the band shaft joint 2 which could receive the extension end 5a, as shown in FIGS. 3, 4, 7 and 8. An axle pin 8 passes through two corresponding pin holes 5aa on the side of the extension end 5a and two pin holes 2a on the side wall of the cavity 9 of the band shaft joint 2, so that the extension end 5a is fixedly connected to the joint 2.

As shown in FIGS. 1 and 2, in this embodiment, a through hole 11 is set on the axle pin 8, through which a driven pin 12 passes. The driven pin 12 passes through two driven pin holes 2b on the band shaft joint 2, two pin holes 5aa on the extension end 5a and the through hole 11 on the axle pin 8, so that the axle pin 8 gets fixed. Furthermore, in order to prevent the driven pin 12 being released, a hole is formed at one end of the driven pin 12 through which a stud 10 passes. The driven pin 12 is perpendicular to the axle pin 8 herein.

As shown in FIGS. 3, 4, 10, 11 and 12, the unidirectional linkage mechanism has six spring holes 16 uniformly distributed on the rotator 3. The spring holes 16 are located at the contact surface of the rotator 3 and the band shaft joint 2, each of which has a spring 17 and a plunger 18 mounted from inside to outside. The plunger 18 is pressed against one side of the band shaft joint 2 under the action of the spring 17. One side of the band shaft joint 2 is provide with a corresponding number of chutes 19 which are located corresponding to the spring holes 16. One side of the chute 19 is a bevel face 20 that inclines along the rotating direction of the rotator 3 and extends to the side surface of the joint 2, while another side is an upright face 21 perpendicular to the side surface of the joint 2. Apparently, as the spring holes 16 are uniformly distributed, the chutes 19 are uniformly distributed on the side of the joint 2.

Figure 4:
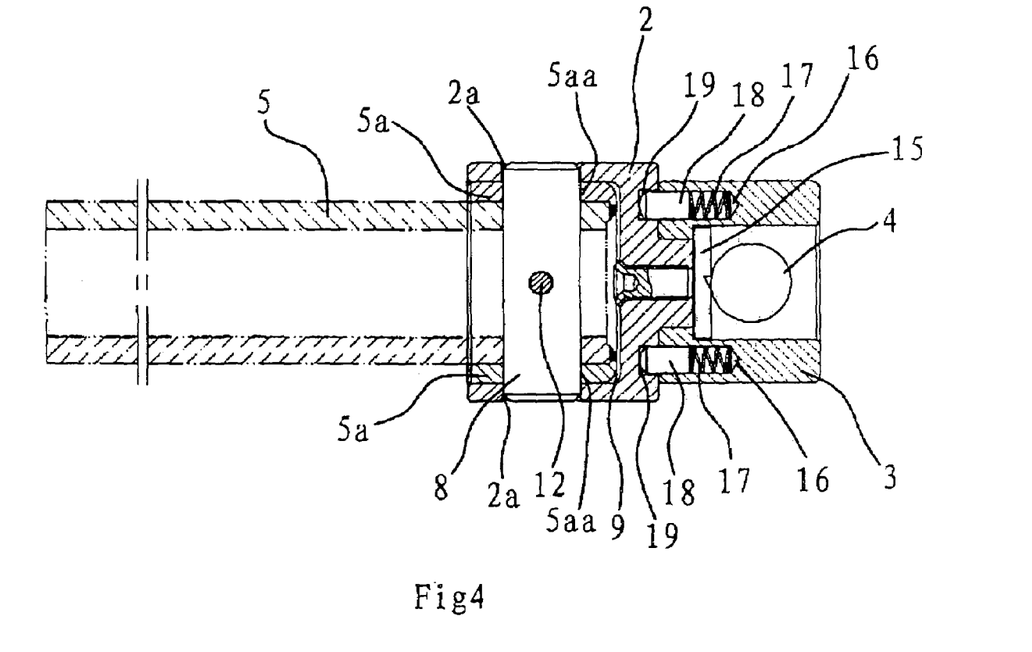
FIG. 4 is a sectional view of the split winch band shaft fast rotating device according to the present invention.
Figure 5:
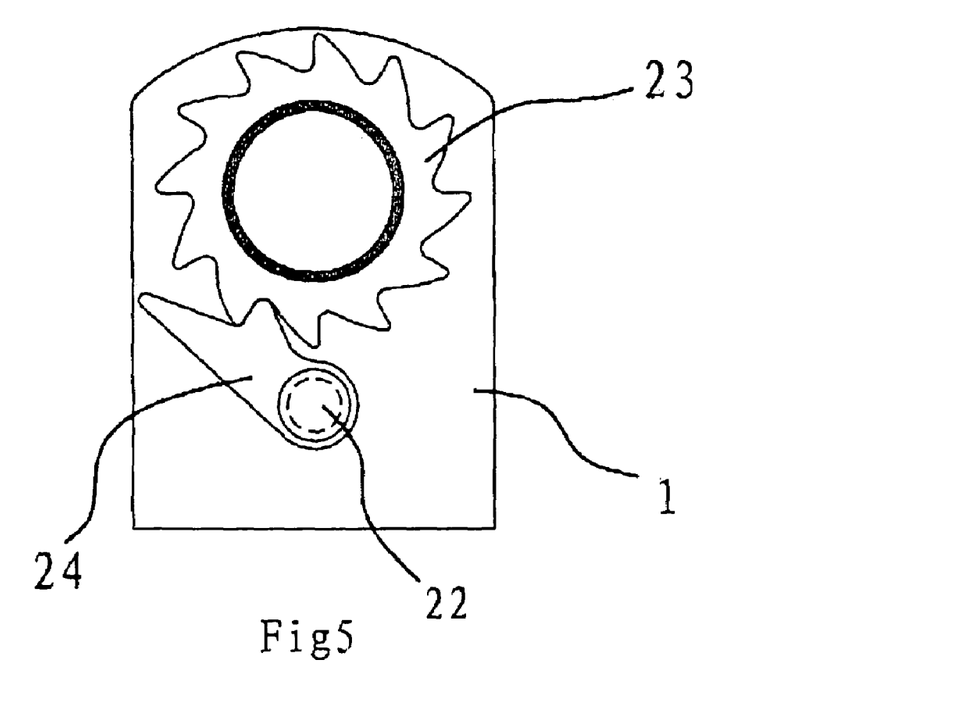
FIG. 5 is a side schematic view of the winch according to the present invention.
Figure 11:
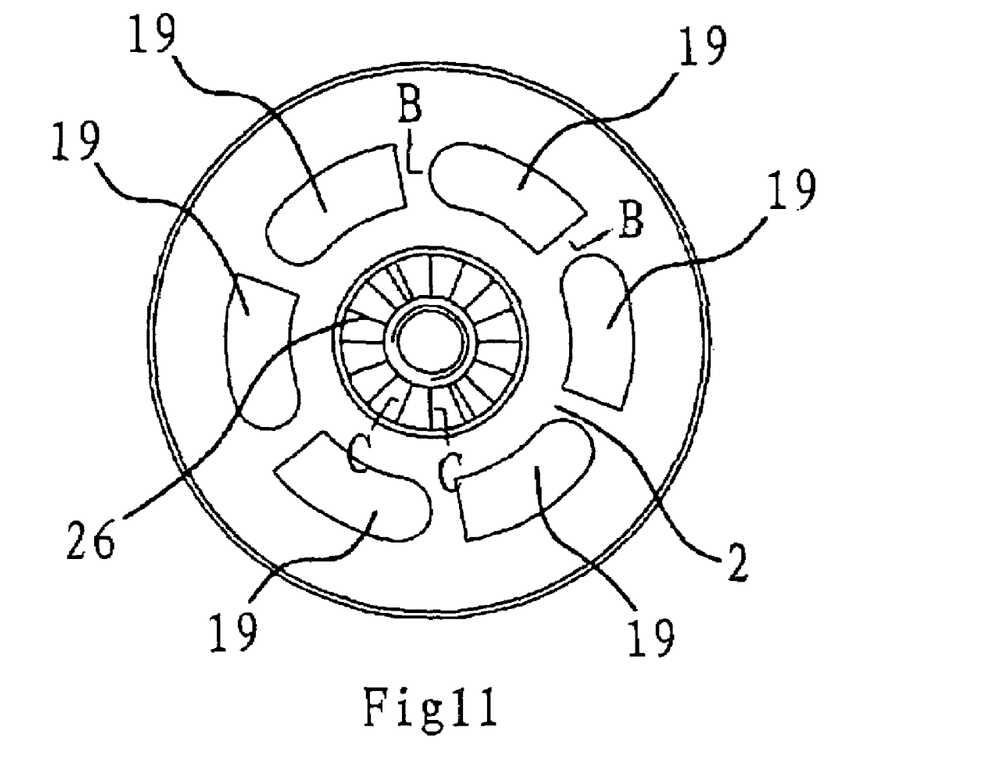
FIG. 11 is a side view of the band shaft joint of the split winch band shaft fast rotating device according to the present invention.
Figure 12:
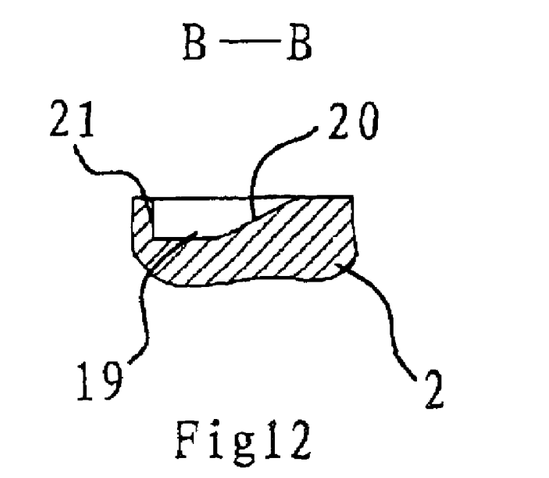
FIG. 12 is a sectional view taken along B-B in FIG. 11.
Figure 13:
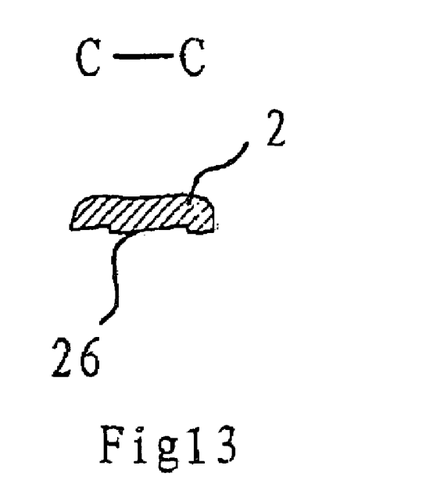
FIG. 13 is a sectional view taken along C-C in FIG. 11.

As shown in FIGS. 3 and 4, a connecting screw 15 is set between the band shaft joint 2 and the rotator 3. The rotator 3 is blocked by the top outer edges of the connecting screw 15 after it is covered on the band shaft joint 2, so that the band shaft joint 2 is joined with the rotator 3 together. Another connecting way is shown in FIGS. 11 and 13, wherein the band shaft joint 2 and the connecting screw 15 are provided with unidirectional teeth 26 engaged with each other at their contact surface. Employing this structure, the rotator 3 will not be detached from the band shaft joint 2, while the rotator 3 could rotator with respect to the joint 2. The unidirectional teeth 26 could make the connecting screw 15 fixedly connected to the joint 2, so as to prevent it loosening in use.

When in use, the band shaft extension end 5a of the winch is inserted into the cavity 9 of the band shaft joint 2. The corresponding pin holes 2a and 5aa on the joint 2 and the band shaft extension end 5a are aligned. Then, an axle pin 8 is inserted, and a driven pin 12 is inserted into the through hole 11. In this way, the device provided by the present invention is fixedly connected to the winch. In this embodiment, two crowbar holes 4 are oppositely arranged on the rotator 3. When using the winch, a crowbar is inserted into the crowbar holes 4 on the rotator 3 and turned to and fro, so that the band shaft is rotated in one way by the unidirectional linkage mechanism to tighten the bundling bands wrapped around the band shaft 5.

Accomplishing the operations described above, the device of the present invention could either still keep connected to the winch, or removed for storage or next use. In the latter case, firstly the stud 10 is pulled out to remove the driven pin 12, then the axle pin 8 is pulled out, so that the device is separate from the winch.

Moreover, as shown in FIGS. 1 and 2, a housing 6 is covered on the outboard of the rotator 3 and the band shaft joint 2, so as to prevent the rain or sundries entering the connection port of the rotator 3 and the band shaft joint 2.

Second Embodiment

Figure 14:
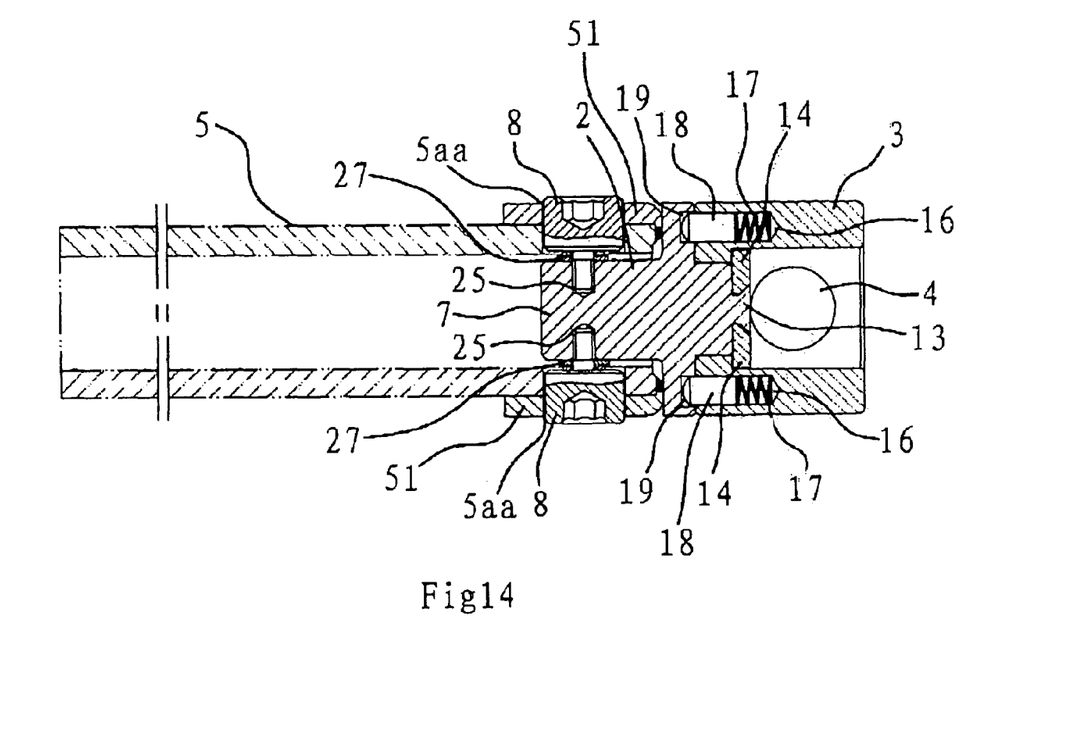
FIG. 14 is a sectional view of a split winch band shaft fast rotating device according to a second embodiment of the present invention.
Figure 15:
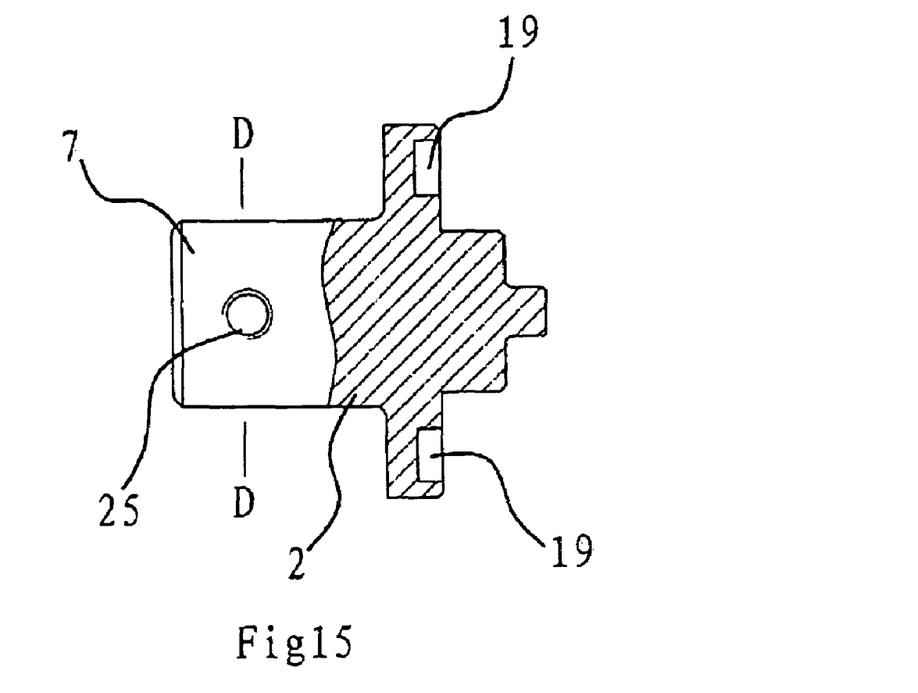
FIG. 15 is a partial schematic view of the band shaft joint of the split winch band shaft fast rotating device according to the second embodiment of the present invention.
Figure 16:
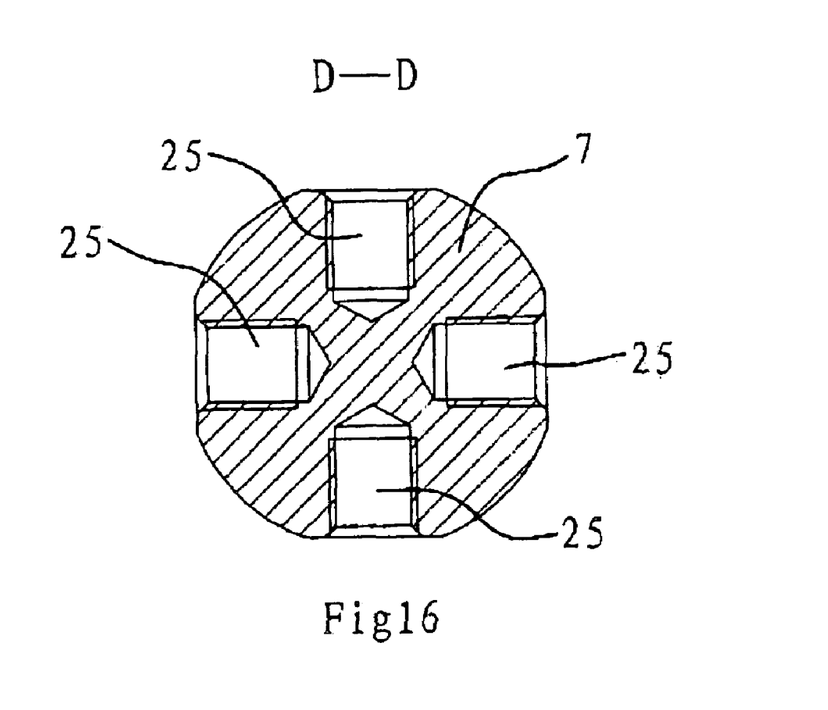
FIG. 16 is an enlarged sectional view taken along D-D in FIG. 15.

Another embodiment of the fast rotating device of the present invention is shown in FIGS. 14, 15 and 16. In this embodiment, one end of the band shaft joint 2 is a post 7, which is inserted into the band shaft extension end 5a. Four pin holes 5aa are uniformly distributed on the band shaft extension end 5a. Four axle pins 8 pass through the corresponding pin holes 5aa on the band shaft extension end 5a and are fixedly connected to the threaded holes 25 on the post 7. The axle pins 8 and post 7 fixedly connect the band shaft extension end 5a to the band shaft joint 2 by thread fitting.

As shown in FIG. 14, a protruded riveting block 13 is disposed at one end of the band shaft joint 2 with a stopper 14 riveted thereto. The rotator 3 is blocked by the outer edges of the stopper 14 after it is covered on the band shaft joint 2, so that the rotator 3 will not be detached from the band shaft joint 2.

When in use, the post 7 of the band shaft joint 2 is inserted into the band shaft extension end 5a. The axle pins 8 pass through the corresponding pin holes 5aa on the band shaft extension end 5a and are fixedly connected to the post 7 by the threaded holes. In order to make the axle pins 8 fixedly connected to the post 7, a spring liner 27 is covered on the axle pins 8. In this way, the fast rotating device provided by the present invention is fixedly connected to the winch.

Figure 17:
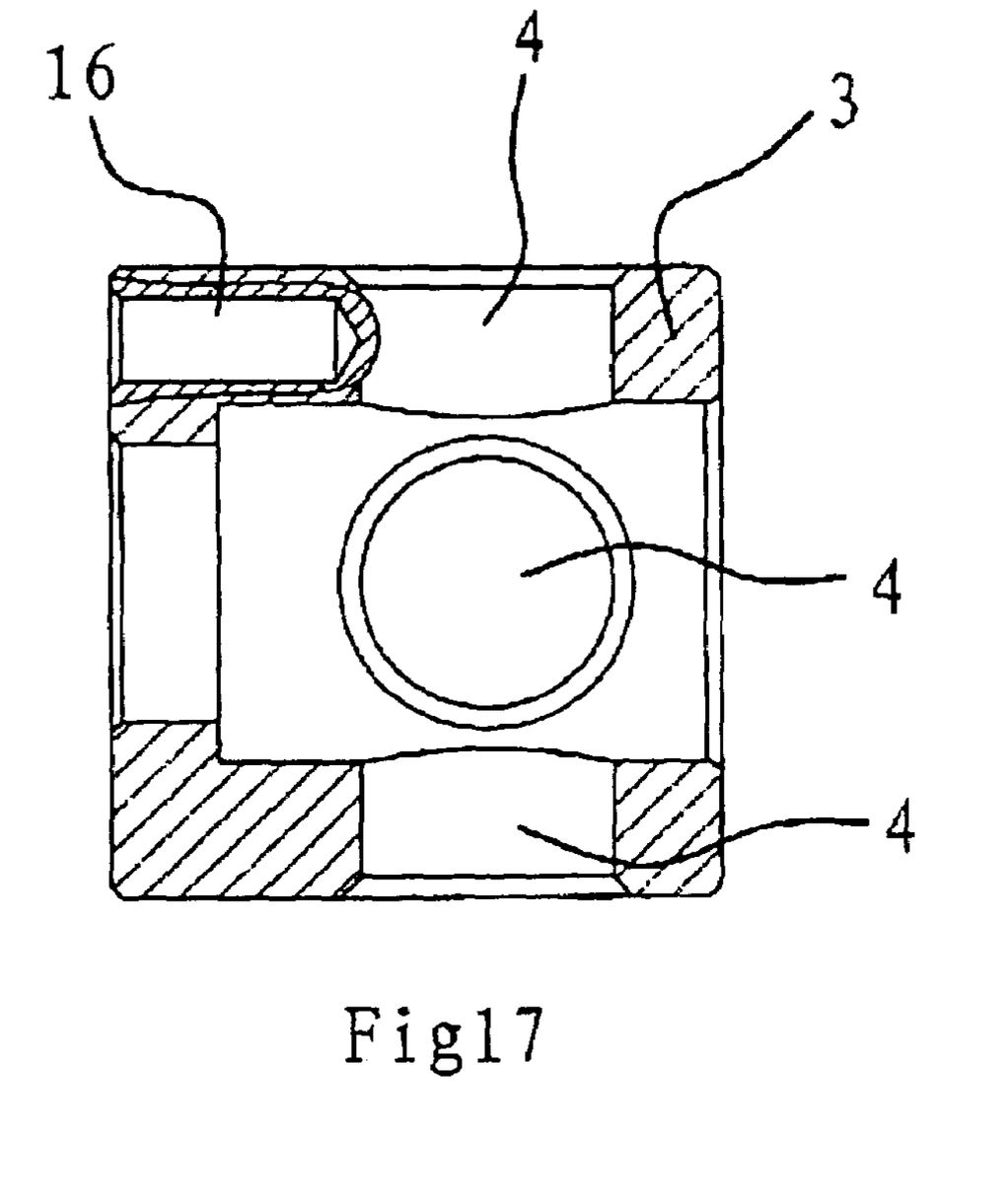
FIG. 17 is a sectional view of the rotator of the split winch band shaft fast rotating device according to the second embodiment of the present invention.

The use of the fast rotating device according to the second embodiment of the invention is the same as that according to the first embodiment. In this embodiment, there are also four crowbar holes 4 uniformly distributed on the rotator 3, as shown in FIG. 17.

After use, the device could be detached from the winch by tools such as the wrench.

For purposes of brief illustration, structures of the second embodiment similar to the first one will not be described in detail here.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the terms, such as winch mount 1, band shaft hole 1a, band shaft joint 2, pin hole 2a, driven pin hole 2b, rotator 3, crowbar hole 4, band shaft 5, band shaft extension end 5a, pin hole 5aa, housing 6, post 7, axle pin 8, cavity 9, stud 10, through hole 11, driven pin 12, riveting block 13, stopper 14, connecting screw 15, spring hole 16, spring 17, plunger 18, chute 19, bevel face 20, upright face 21, ratchet axle 22, unidirectional ratchet wheel 23, ratchet 24, threaded hole 25, unidirectional tooth 26, spring liner 27 and the like, are used herein, other terms are not excluded. These terms are merely used to illustrate and explain the essence of the invention without any limitation.

LIST OF REFERENCE NUMERALS winch mount 1
band shaft hole 1a
band shaft joint 2
pin hole 2a
driven pin hole 2b
rotator 3
crowbar hole 4
band shaft 5
band shaft extension end 5a
pin hole 5aa
housing 6
post 7
axle pin 8
cavity 9
stud 10
through hole 11
driven pin 12
riveting block 13
stopper 14
connecting screw 15
spring hole 16
spring 17
plunger 18
chute 19
bevel face 20
upright face 21
ratchet axle 22
unidirectional ratchet wheel 23
ratchet 24
threaded hole 25
unidirectional tooth 26
spring liner 27

What is claimed is:

1. A split winch band shaft fast rotating device disposed at a band shaft extension end (5a) at one side of a winch mount (1), comprising
a band shaft joint (2), and
a rotator (3) with at least one crowbar hole (4) thereon, the rotator (3) is coupled to one side of the band shaft joint (2) with a unidirectional linkage mechanism set at a contact surface thereof,
wherein the band shaft extension end (5a) has at least one pin hole (5aa), the band shaft joint (2) is inserted into or covered on the band shaft extension end (5a), and a detachable connection mechanism is provided between the band shaft joint (2) and the band shaft extension end (5a) which fixedly connects the joint to the extension end by inserting one or more axle pins (8) into the pin holes (5aa),
wherein the connection mechanism is a post (7) set at one end of the band shaft joint (2) which could be inserted into the band shaft extension end (5a), the one or more axle pins (8) pass through the corresponding pin holes (5aa) on the band shaft extension end (5a) and are fixedly connected to the post (7).

2. The split winch band shaft fast rotating device as claimed in claim 1, characterized in that, there are several pin holes (5aa), each of which has one of said axle pins (8) passed through, and the axle pins (8) are threadedly connected to the post (7).

3. A split winch band shaft fast rotating device disposed at a band shaft extension end (5a) at one side of a winch mount (1), comprising
a band shaft joint (2), and
a rotator (3) with at least one crowbar hole (4) thereon, the rotator (3) is coupled to one side of the band shaft joint (2) with a unidirectional linkage mechanism set at a contact surface thereof,
wherein the band shaft extension end (5a) has at least one pin hole (5aa), the band shaft joint (2) is inserted into or covered on the band shaft extension end (5a), and a detachable connection mechanism is provided between the band shaft joint (2) and the band shaft extension end (5a) which fixedly connects the joint to the extension end by inserting one or more axle pins (8) into the pin holes (5aa),
wherein the connection mechanism is a cavity (9) set at one end of the band shaft joint (2) which could receive the band shaft extension end (5a), several pin holes (2a) are set on the side wall of the cavity (9), one of said axle pins (8) passes through the pin holes (5aa) on the band shaft extension end (5a) and the pin holes (2a) on the side wall of the cavity (9),
wherein a through hole (11) is set on the axle pin (8) through which a driven pin (12) passes, the driven pin (12) is inserted into the pin holes (5aa) on the band shaft extension end (5a) and the driven pin holes (2b) on the band shaft joint (2).

4. The split winch band shaft fast rotating device as claimed in claim 1, wherein a protruded riveting block (13) is disposed at one end of the band shaft joint (2) with a stopper (14)

riveted thereto, and the rotator (3) is blocked by the outer edges of the stopper (14) after it is covered on the band shaft joint (2).

5. The split winch band shaft fast rotating device as claimed in claim 1, wherein a connecting screw (15) is disposed between the band shaft joint (2) and the rotator (3), the rotator (3) is blocked by the top outer edges of the connecting screw (15) after it is covered on the band shaft joint (2).

6. The split winch band shaft fast rotating device as claimed in claim 1, wherein the unidirectional linkage mechanism comprises several spring holes (16) arranged on the rotator (3) at the contact surface of the rotator (3) and the band shaft joint (2), each of which has a spring (17) and a plunger (18) mounted within said spring holes, the plunger (18) is pressed against one side of the band shaft joint (2) under the action of the spring (17), one side of the band shaft joint (2) is provide with a corresponding number of chutes (19) which are located corresponding to the spring holes (16), one side of the chute (19) is a bevel face (20) that inclines along the rotating direction of the rotator (3) and extends to the side surface of the band shaft joint (2), while another side is an upright face (21) perpendicular to the side surface of the band shaft joint (2).

7. The split winch band shaft fast rotating device as claimed in claim 1, wherein the unidirectional linkage mechanism comprises several spring holes (16) arranged on the rotator (3) at the contact surface of the rotator (3) and the band shaft joint (2), each of which has a spring (17) and a plunger (18) mounted from inside to outside, the plunger (18) is pressed against one side of the band shaft joint (2) under the action of the spring (17), one side of the band shaft joint (2) is provide with a corresponding number of chutes (19) which are located corresponding to the spring holes (16), one side of the chute (19) is a bevel face (20) that inclines along the rotating direction of the rotator (3) and extends to the side surface of the band shaft joint (2), while another side is an upright face (21) perpendicular to the side surface of the band shaft joint (2).

8. The split winch band shaft fast rotating device as claimed in claim 2, wherein the unidirectional linkage mechanism comprises several spring holes (16) arranged on the rotator (3) at the contact surface of the rotator (3) and the band shaft joint (2), each of which has a spring (17) and a plunger (18) mounted from inside to outside, the plunger (18) is pressed against one side of the band shaft joint (2) under the action of the spring (17), one side of the band shaft joint (2) is provide with a corresponding number of chutes (19) which are located corresponding to the spring holes (16), one side of the chute (19) is a bevel face (20) that inclines along the rotating direction of the rotator (3) and extends to the side surface of the band shaft joint (2), while another side is an upright face (21) perpendicular to the side surface of the band shaft joint (2).

9. The split winch band shaft fast rotating device as claimed in claim 3, wherein the unidirectional linkage mechanism comprises several spring holes (16) arranged on the rotator (3) at the contact surface of the rotator (3) and the band shaft joint (2), each of which has a spring (17) and a plunger (18) mounted from inside to outside, the plunger (18) is pressed against one side of the band shaft joint (2) under the action of the spring (17), one side of the band shaft joint (2) is provide with a corresponding number of chutes (19) which are located corresponding to the spring holes (16), one side of the chute (19) is a bevel face (20) that inclines along the rotating direction of the rotator (3) and extends to the side surface of the band shaft joint (2), while another side is an upright face (21) perpendicular to the side surface of the band shaft joint (2).

10. The split winch band shaft fast rotating device as claimed in claim 6, wherein the chutes (19) are uniformly distributed on the side of the band shaft joint (2), and the spring holes (16) are uniformly distributed on the rotator (3).

11. The split winch band shaft fast rotating device as claimed in claim 7, wherein the chutes (19) are uniformly distributed on the side of the band shaft joint (2), and the spring holes (16) are uniformly distributed on the rotator (3).

12. The split winch band shaft fast rotating device as claimed in claim 8, wherein the chutes (19) are uniformly distributed on the side of the band shaft joint (2), and the spring holes (16) are uniformly distributed on the rotator (3).

13. The split winch band shaft fast rotating device as claimed in claim 9, wherein the chutes (19) are uniformly distributed on the side of the band shaft joint (2), and the spring holes (16) are uniformly distributed on the rotator (3).

14. The split winch band shaft fast rotating device as claimed in claim 6, wherein two crowbar holes (4) for the crowbar are oppositely arranged on the rotator (3).

15. The split winch band shaft fast rotating device as claimed in claim 7, wherein two crowbar holes (4) for the crowbar are oppositely arranged on the rotator (3).

16. The split winch band shaft fast rotating device as claimed in claim 9, wherein two crowbar holes (4) for the crowbar are oppositely arranged on the rotator (3).

17. The split winch band shaft fast rotating device as claimed in claim 3, wherein a protruded riveting block (13) is disposed at one end of the band shaft joint (2) with a stopper (14) riveted thereto, and the rotator (3) is blocked by the outer edges of the stopper (14) after it is covered on the band shaft joint (2).

18. The split winch band shaft fast rotating device as claimed in claim 3, wherein a connecting screw (15) is disposed between the band shaft joint (2) and the rotator (3), the rotator (3) is blocked by the top outer edges of the connecting screw (15) after it is covered on the band shaft joint (2).

19. The split winch band shaft fast rotating device as claimed in claim 3, wherein the unidirectional linkage mechanism comprises several spring holes (16) arranged on the rotator (3) at the contact surface of the rotator (3) and the band shaft joint (2), each of which has a spring (17) and a plunger (18) mounted within said spring holes, the plunger (18) is pressed against one side of the band shaft joint (2) under the action of the spring (17), one side of the band shaft joint (2) is provide with a corresponding number of chutes (19) which are located corresponding to the spring holes (16), one side of the chute (19) is a bevel face (20) that inclines along the rotating direction of the rotator (3) and extends to the side surface of the band shaft joint (2), while another side is an upright face (21) perpendicular to the side surface of the band shaft joint (2).

* * * * *